(12) United States Patent
Wang

(10) Patent No.: US 11,353,993 B2
(45) Date of Patent: Jun. 7, 2022

(54) OPTICAL DETECTION DEVICE

(71) Applicant: PixArt Imaging Inc., Hsin-Chu (TW)

(72) Inventor: Wei-Chung Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/867,547

(22) Filed: May 5, 2020

(65) Prior Publication Data

US 2021/0349560 A1 Nov. 11, 2021

(51) Int. Cl.
*G06F 3/042* (2006.01)
*G06F 3/041* (2006.01)
*G06F 3/03* (2006.01)
*G06F 3/0354* (2013.01)

(52) U.S. Cl.
CPC ............ *G06F 3/042* (2013.01); *G06F 3/0416* (2013.01)

(58) Field of Classification Search
USPC ......................................................... 345/175
See application file for complete search history.

(56) References Cited

U.S. PATENT DOCUMENTS

| | | | | |
|---|---|---|---|---|
| 5,092,459 A * | 3/1992 | Uljanic | ................ | H01H 9/0242 235/145 R |
| 5,355,148 A * | 10/1994 | Anderson | ............. | G06F 3/0304 345/166 |
| 5,388,692 A * | 2/1995 | Withrow | ............. | F21V 33/0052 362/85 |
| 6,410,918 B1 * | 6/2002 | Kouznetsov | ....... | G01N 21/3504 250/343 |
| 6,634,494 B1 * | 10/2003 | Derr | ........................ | G01D 11/24 206/320 |
| 8,672,127 B1 * | 3/2014 | Clover | ............. | H04N 21/42204 206/320 |
| 10,475,937 B1 * | 11/2019 | Jones | ..................... | H01L 31/173 |
| 10,734,540 B1 * | 8/2020 | Chen | ....................... | H01L 31/18 |
| 10,945,664 B1 * | 3/2021 | Webb | .................... | A61B 5/0059 |
| 2009/0074263 A1 * | 3/2009 | Higuchi | ............. | G06V 40/1335 382/126 |
| 2009/0167683 A1 * | 7/2009 | Motoe | ................... | G06F 1/1616 345/158 |
| 2011/0018800 A1 * | 1/2011 | Ahn | ....................... | G06F 1/1616 345/157 |
| 2011/0029185 A1 * | 2/2011 | Aoki | ....................... | G06F 3/017 701/31.4 |
| 2011/0248152 A1 * | 10/2011 | Svajda | .................. | G01S 7/4811 250/221 |

(Continued)

*Primary Examiner* — Chineyere D Wills-Burns
(74) *Attorney, Agent, or Firm* — Winston Hsu

(57) ABSTRACT

An optical detection device is applied to an optical finger navigation apparatus and suitable for a variety of appearance demands in order to simplify product qualification procedure. The optical detection device includes a substrate, a housing, an optical sensor and a cover. The housing is disposed on the substrate and comprising a first aperture. The optical sensor is disposed on the substrate and adapted to receive an optical signal through the first aperture. The cover is disposed on the housing to cover the first aperture. The cover has a first surface and a second surface opposite to each other. The first surface with a contour matched with a shape of the housing is attached to the housing, and the second surface with a contour manufactured for a predefined appearance demand does not affect conjunction between the housing and the cover.

14 Claims, 3 Drawing Sheets

(56) References Cited

U.S. PATENT DOCUMENTS

| | | | | |
|---|---|---|---|---|
| 2013/0105822 A1* | 5/2013 | Wang | .................... | H01L 31/125 |
| | | | | 257/82 |
| 2013/0341650 A1* | 12/2013 | Peng | .................. | H01L 31/0203 |
| | | | | 257/82 |
| 2014/0131560 A1* | 5/2014 | Chen | .................... | G01S 7/4813 |
| | | | | 250/221 |
| 2015/0226839 A1* | 8/2015 | Brandl | .................. | G01S 7/4816 |
| | | | | 250/221 |
| 2017/0089757 A1* | 3/2017 | Geiger | ..................... | G01J 1/08 |
| 2017/0308188 A1* | 10/2017 | Hayashi | ............... | H05K 1/0203 |
| 2018/0006182 A1* | 1/2018 | Renard | ................ | G01S 7/4813 |
| 2020/0350455 A1* | 11/2020 | Gopal Krishnan | ... | G01S 7/4863 |
| 2021/0074874 A1* | 3/2021 | Nijaguna | .............. | H01L 25/167 |

* cited by examiner

OPTICAL DETECTION DEVICE

BACKGROUND OF THE INVENTION

1. Field of the Invention

The present invention relates to an optical detection device, and more particularly, to an optical detection device applied to an optical finger navigation apparatus and suitable for a variety of appearance demands in order to simplify product qualification procedure.

2. Description of the Prior Art

A conventional optical detection device includes a base and a housing assembled with each other to provide two chambers inside. An optical emitter is disposed inside one chamber, and an optical sensor is disposed inside another chamber. Then, a covering component covers the housing and is attached to all lateral surfaces of the housing and the base, and some optical components, such as lenses, are disposed between the housing and the covering component. The conventional optical detection device has to be installed on a flexible printed circuit of an optical navigation system, and an upper part of the covering component is exposed out of a hole of the optical navigation system for detecting an object. A chip package consisted of the base, the housing, the optical emitter and the optical sensor (excluding the covering component) cannot be suitable for a variety of appearance demands of the optical navigation system. The chip package and the related covering component both have to be redesigned if the hole shape of the optical navigation system is changed, such as the hole being changed from the square shape to the round shape, and therefore product qualification procedure of the conventional optical detection device is implemented after the chip package and the related covering component are redesigned and assembled.

SUMMARY OF THE INVENTION

The present invention provides an optical detection device applied to an optical finger navigation apparatus and suitable for a variety of appearance demands in order to simplify product qualification procedure for solving above drawbacks.

According to the claimed invention, an optical detection device applied to an optical finger navigation apparatus and suitable for a variety of appearance demands in order to simplify product qualification procedure is disclosed. The optical detection device includes a substrate, a housing, an optical sensor and a cover. The housing is disposed on the substrate and comprising a first aperture. The optical sensor is disposed on the substrate and adapted to receive an optical signal through the first aperture. The cover is disposed on the housing to cover the first aperture. The cover has a first surface and a second surface opposite to each other. The first surface with a contour matched with a shape of the housing is attached to the housing, and the second surface with a contour manufactured for a predefined appearance demand does not affect conjunction between the housing and the cover.

According to the claimed invention, the housing comprises an engaging portion adapted to engage with the optical finger navigation apparatus. The engaging portion is adjacent to an upper portion of the housing, and the first surface of the cover is attached to the upper portion and the engaging portion. An edge of the cover aligns with a lateral side of the engaging portion.

According to the claimed invention, the cover is not attached to a lateral portion of the housing. The optical detection device is in no need of extra product qualification procedure in response to assembly of the cover and the housing.

According to the claimed invention, the housing further includes a second aperture, and the optical detection device further includes an optical emitter disposed on the substrate and adapted to emit the optical signal toward the second aperture.

According to the claimed invention, the optical detection device further includes an operation processor electrically connected to the optical sensor and adapted to analyze a sensor datum from the optical sensor.

According to the claimed invention, an optical detection device applied to an optical finger navigation apparatus and suitable for a variety of appearance demands in order to simplify product qualification procedure is disclosed. The optical detection device includes a substrate, a housing, an optical sensor and a cover. The housing is disposed on the substrate and includes a first aperture and an engaging portion. The engaging portion is adapted to engage with the optical finger navigation apparatus. The optical sensor is disposed on the substrate and adapted to receive an optical signal through the first aperture. The cover is attached to the housing except the engaging portion for covering the first aperture, the cover has a contour manufactured for a predefined appearance demand.

According to the claimed invention, the engaging portion is adjacent to an upper portion of the housing, and the cover is attached to the upper portion. An edge of the cover aligns with a lateral side of the upper portion. The cover is not attached to a lateral surface of the upper portion of the housing.

The cover directly abutting against the housing can minimize a vertical dimension of the optical detection device, and the cover disposed on the upper surface of the housing can reduce a horizontal dimension of the optical detection device. The package assembly including the substrate, the housing, the optical sensor, the optical emitter and the operation processor (but excluding the cover) can be assembled and examined by the product qualification procedure, and the cover can be an independent element not examined by the product qualification procedure. The package assembly can be assembled with the cover having any exterior contour manufactured for the appearance demand of the optical finger navigation apparatus. That is to say, the optical finger navigation apparatus provides the cover and the package assembly as two separated components. The contour of the cover is designed according to the hole on the optical finger navigation apparatus. The exterior of the package assembly is unchanged no matter what the cover seems like. As if the product qualification procedure of the package assembly is implemented, the cover with the particularly redesigned contour can be attached to the package assembly and does not need extra product qualification procedure for the second time; thus, the present invention can economize qualification cost and qualification time of the optical detection device effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
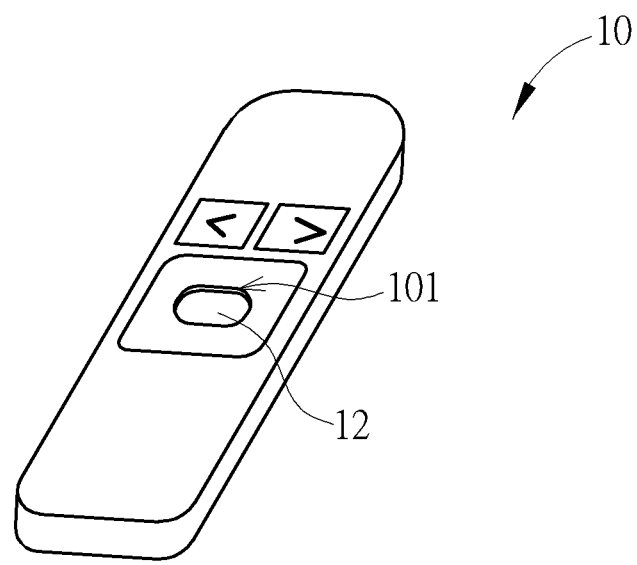
FIG. 1 is a diagram of an optical finger navigation apparatus having an optical detection device according to an embodiment of the present invention.
Figure 2:
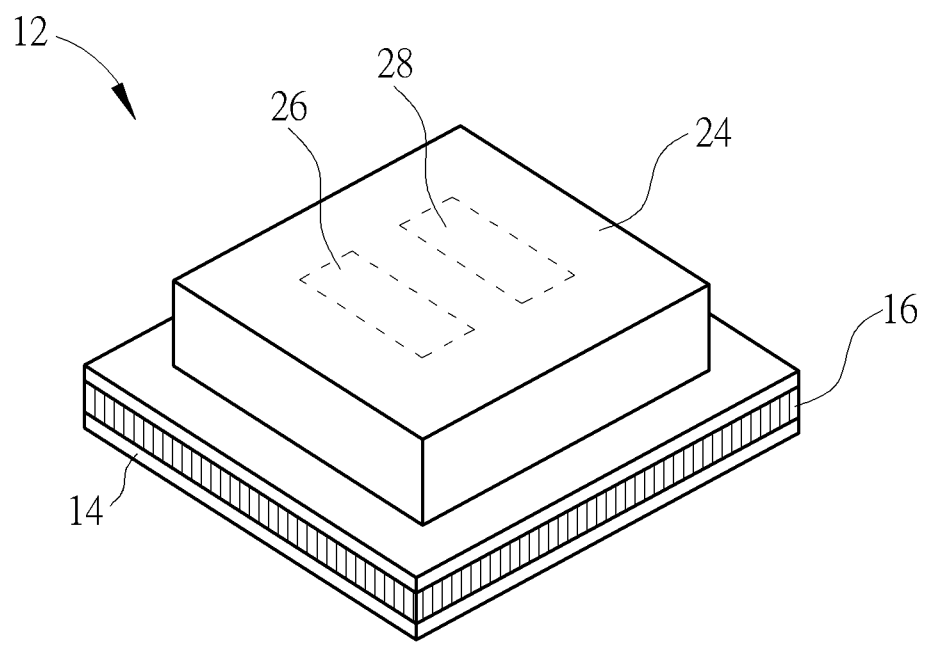
FIG. 2 is a diagram of the optical detection device according to a first embodiment of the present invention.
Figure 3:
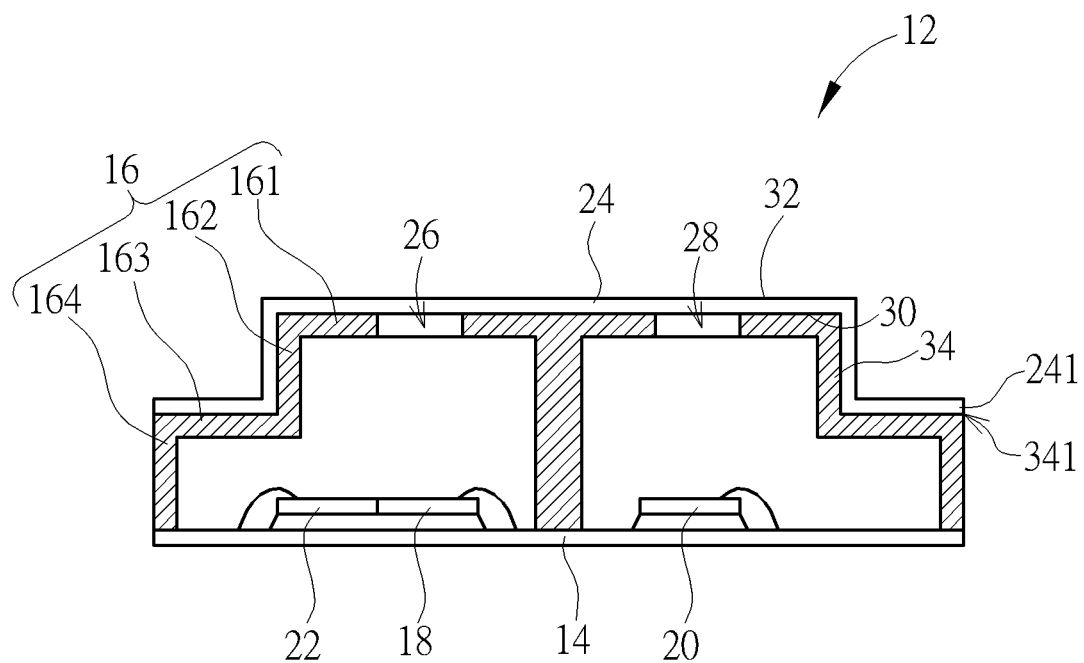
FIG. 3 is a sectional view of the optical detection device according to the first embodiment of the present invention.

Please refer to FIG. 1 to FIG. 3. FIG. 1 is a diagram of an optical finger navigation apparatus 10 having an optical detection device 12 according to an embodiment of the present invention. FIG. 2 is a diagram of the optical detection device 12 according to a first embodiment of the present invention. FIG. 3 is a sectional view of the optical detection device 12 according to the first embodiment of the present invention. The optical finger navigation apparatus 10 can be the remote control, the in-vehicle infotainment system, the steering wheel, the notebook computer, and the medical equipment. Exterior of the optical detection device 12 can be designed to match with a variety of predefined appearance demands of the optical finger navigation apparatus 10 for simplifying product qualification procedure.

The optical detection device 12 can include a substrate 14, a housing 16, an optical sensor 18, an optical emitter 20, an operation processor 22 and a cover 24. The housing 16 can be disposed on the substrate 14 and have a first aperture 26 and a second aperture 28. The optical sensor 18, the optical emitter 20 and the operation processor 22 can be disposed on the substrate 14 and electrically connected with each other. The optical emitter 20 can be an optional unit adapted to emit an optical signal toward the second aperture 28. The optical emitter 20 can receive the optional unit reflected from a target object through the first aperture 26. The operation processor 22 can actuate the optical emitter 20 to adjust a frequency and intensity of the optical signal, and further receive a sensor datum from the optical sensor 18 for analysis. The cover 24 can be disposed on the housing 16 to cover the first aperture 26 and the second aperture 28.

The cover 24 can have a first surface 30 and a second surface 32 opposite to each other. The first surface 30 can be attached to the housing 16 and designed to provide a contour matched with a shape of the housing 16. Conjunction between the housing 16 and the cover 24 is not affected by a contour of the second surface 32, so that the contour of the second surface 32 can be manufactured according to the predefined appearance of the optical finger navigation apparatus 10. For example, the second surface 32 of the cover 24 can be a square form or a circular form. The form of the second surface 32 depends on the hole 101 on the optical finger navigation apparatus 10. A top portion of the optical detection device 12 can be embedded in the hole 101 for providing a touching region.

In the first embodiment, the optical sensor 18, the optical emitter 20 and the operation processor 22 can be assembled with the substrate 14 and the housing 16 to be one package assembly; the package assembly and the cover 24 can be two separated components for delivery and storage. The package assembly can be disposed on the optical finger navigation apparatus 10 when the product qualification procedure of the package assembly is finished. After that, the cover 24 can be assembled with the package assembly without another product qualification procedure, which means the optical detection device 12 is in no need of extra product qualification procedure in response to assembly of the cover 24 and the housing 16. Thus, if the optical finger navigation apparatus 10 has two holes 101 respectively having the square form and the circular form, two package assembles with identical structure need once product qualification procedure, and covers 24 with different forms can be assembled with the two package assembles without the extra product qualification procedure; the second surface 32 of the cover 24 can be manufactured as any contours according to a purpose of the touching region of the optical detection device 12.

Besides, the housing 16 may optionally include an engaging portion 34 formed on an edge around the touching region of the optical detection device 12 and adapted to engage with the optical finger navigation apparatus 10; part of the cover 24 may be located between the engaging portion 34 and the optical finger navigation apparatus 10. An upper portion 161 of the housing 16 can be set under a part of the cover 24 used as the touching region, and have dimensions the same as or similar to the touching region and the hole 101 on the optical finger navigation apparatus 10. The engaging portion 34 may be interpreted as a combination of a high-level lateral portion 162 and a flat portion 163 of the housing 16, which can be connected with and adjacent to the upper portion 161, and be sheltered by some part of the cover 24. The engaging portion 34 can abut against an inner wall of the hole 101 to securely fix the optical detection device 12 into the optical finger navigation apparatus 10.

The first surface 30 of the cover 24 has the contour matched with the shape of the housing 16, so that the first surface 30 can be tightly attached to the upper portion 161 and the engaging portion 34; an edge 241 of the cover 24 can optionally align with a lateral side 341 of the engaging portion 34, and therefore the cover 24 is not attached to a low-level lateral portion 164 of the housing 16. A protruding part of the cover 24, which abuts against the upper portion 161 and the high-level lateral portion 162, can be the touching region of the optical detection device 12 exposed out of the optical finger navigation apparatus 10. A shape of the protruding part is predesigned to match up the hole 101 on the optical finger navigation apparatus 10, and the cover 24 can be attached to the housing 16 when the optical detection device 12 passes the product qualification procedure.

Figure 4:
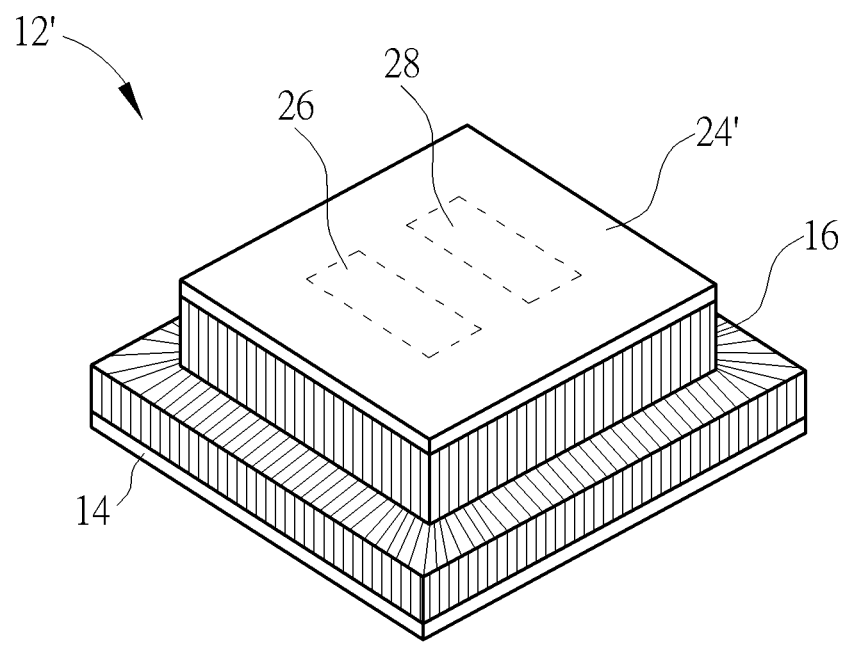
FIG. 4 is a diagram of the optical detection device according to a second embodiment of the present invention.
Figure 5:
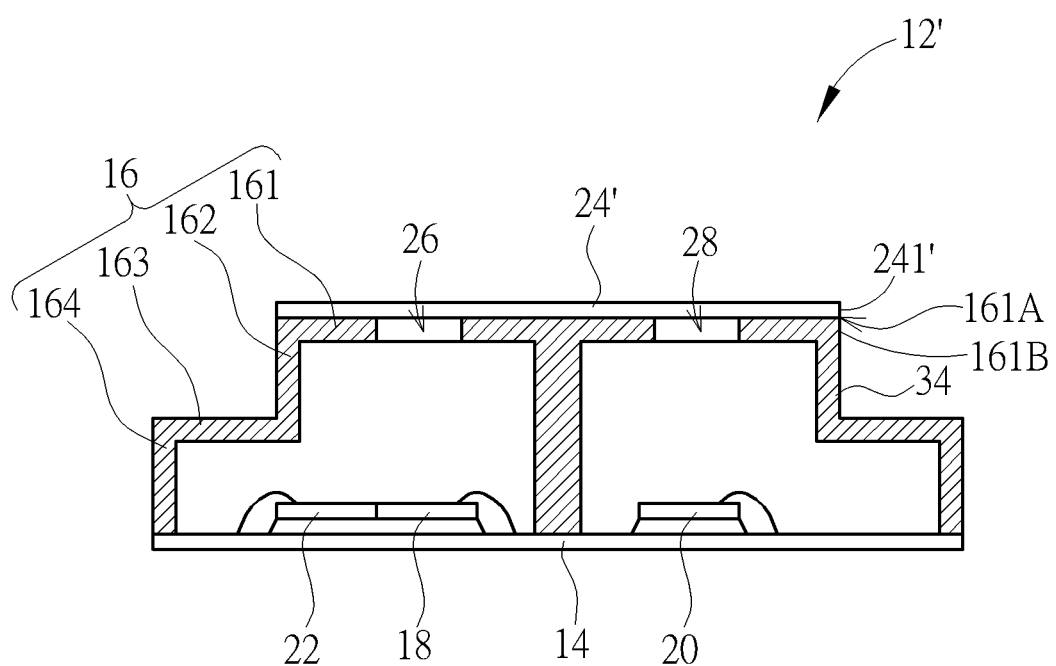
FIG. 5 is a sectional view of the optical detection device according to the second embodiment of the present invention.

Please refer to FIG. 1, FIG. 4 and FIG. 5. FIG. 4 is a diagram of the optical detection device 12' according to a second embodiment of the present invention. FIG. 5 is a sectional view of the optical detection device 12' according to the second embodiment of the present invention. In the second embodiment, elements having the same numeral as ones of the first embodiment have the same structure and function, and a detailed description is omitted herein for simplicity. The optical detection device 12' can include the substrate 14, the housing 16, the optical sensor 18, the optical emitter 20, the operation processor 22 and the cover 24'. The cover 24' covers the upper portion 161 of the housing 16, but does not cover the high-level lateral portion 162, the flat portion 163 and the low-level lateral portion 164. The product qualification procedure of the optical detection device 12' can be implemented after the cover 24' is attached to the housing 16.

In the second embodiment, the cover 24' can be designed to provide the contour manufactured for the predefined appearance demands of the optical finger navigation apparatus 10. The cover 24' can be attached to the housing 16 except the engaging portion 34, which means the edge 241' of the cover 24' can align with a lateral side 161A of the upper portion 161 and the cover 24' does not contact a lateral surface 161B of the upper portion 161. The optical detection device 12 of the first embodiment and the optical detection device 12' of the second embodiment can be directly installed into the optical finger navigation apparatus 10, rather than being disposed on a flexible printed circuit of the optical finger navigation apparatus 10.

In the present invention, the cover directly abutting against the housing can minimize a vertical dimension of the optical detection device, and the cover disposed on the upper surface of the housing can reduce a horizontal dimension of the optical detection device. The package assembly including the substrate, the housing, the optical sensor, the optical emitter and the operation processor (but excluding the cover) can be assembled and examined by the product qualification procedure, and the cover can be an independent element not examined by the product qualification procedure. The package assembly can be assembled with the cover having any exterior contour manufactured for the appearance demand of the optical finger navigation apparatus. That is to say, the optical finger navigation apparatus provides the cover and the package assembly as two separated components. The contour of the cover is designed according to the hole on the optical finger navigation apparatus. The exterior of the package assembly is unchanged no matter what the cover seems like. As if the product qualification procedure of the package assembly is implemented, the cover with the particularly redesigned contour can be attached to the package assembly and does not need extra product qualification procedure for the second time; thus, the present invention can economize qualification cost and qualification time of the optical detection device effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detection device applied to an optical finger navigation apparatus and suitable for a variety of appearance, the optical detection device comprising:
   a substrate;
   a housing disposed on the substrate and comprising an inner space with a first aperture, the housing being unvaried by inspection standard or design requirement of the optical detection device;
   an optical sensor disposed on the substrate and adapted to receive an optical signal through the first aperture; and
   a cover disposed on an upper side of the housing to expose a lateral of the housing and to seal the inner space by covering the first aperture, the cover having a first surface and a second surface opposite to each other, the first surface with a contour matched with a shape of the housing being attached to the housing, and the second surface with a contour manufactured for a predefined appearance not affecting conjunction between the housing and the cover, wherein the cover is replaceable for attaching the cover varied for the inspection standard or the design requirement to the unvaried housing in response to the contour of the second surface matched and engaged with a hole on the optical finger navigation apparatus.

2. The optical detection device of claim 1, wherein the housing comprises an engaging portion adapted to engage with the optical finger navigation apparatus.

3. The optical detection device of claim 2, wherein the engaging portion is adjacent to an upper portion of the housing, and the first surface of the cover is attached to the upper portion and the engaging portion.

4. The optical detection device of claim 2, wherein an edge of the cover aligns with a lateral side of the engaging portion.

5. The optical detection device of claim 1, wherein the cover is not attached to a lateral portion of the housing.

6. The optical detection device of claim 1, wherein the optical detection device is in no need of extra product qualification procedure in response to assembly of the cover and the housing.

7. The optical detection device of claim 1, wherein the housing further comprises a second aperture, and the optical detection device further comprises an optical emitter disposed on the substrate and adapted to emit the optical signal toward the second aperture.

8. The optical detection device of claim 1, wherein the optical detection device further comprises an operation processor electrically connected to the optical sensor and adapted to analyze a sensor datum from the optical sensor.

9. An optical detection device applied to an optical finger navigation apparatus and suitable for a variety of appearance, the optical detection device comprising:
   a substrate;
   a housing disposed on the substrate and comprising an inner space with a first aperture and an engaging portion, the engaging portion being adapted to engage with the optical finger navigation apparatus, the housing being unvaried by inspection standard or design requirement of the optical detection device;
   an optical sensor disposed on the substrate and adapted to receive an optical signal through the first aperture; and
   a cover attached to an upper side of the housing except the engaging portion for exposing a lateral of the housing and sealing the inner space by covering the first aperture, the cover having a contour manufactured for a predefined appearance, wherein the cover is replaceable for attaching the cover varied for the inspection standard or the design requirement to the unvaried housing in response to the contour of the second surface matched and engaged with a hole on the optical finger navigation apparatus.

10. The optical detection device of claim 9, wherein the engaging portion is adjacent to an upper portion of the housing, and the cover is attached to the upper portion.

11. The optical detection device of claim 10, wherein an edge of the cover aligns with a lateral side of the upper portion.

12. The optical detection device of claim 10, wherein the cover is not attached to a lateral surface of the upper portion of the housing.

13. The optical detection device of claim 9, wherein the housing further comprises a second aperture, and the optical detection device further comprises an optical emitter disposed on the substrate and adapted to emit the optical signal toward the second aperture.

14. The optical detection device of claim 9, wherein the optical detection device further comprises an operation processor electrically connected to the optical sensor and adapted to analyze a sensor datum from the optical sensor.

* * * * *